United States Patent
Medicherla et al.

(10) Patent No.: US 12,474,934 B2
(45) Date of Patent: Nov. 18, 2025

(54) SYSTEM CONTEXT-CONTROLLED THIRD-PARTY FIRMWARE DISPLAY AND CONFIGURATION BY PARSING PRE-BOOT FIRMWARE APPLICATION BASED ON VIRTUAL FORMS REPRESENTATION (VFR)

(71) Applicant: Dell Products L.P., Round Rock, TX (US)

(72) Inventors: Laxmi Lavanya Medicherla, Georgetown, TX (US); Ibrahim Sayyed, Georgetown, TX (US); Jagadish Babu Jonnada, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 171 days.

(21) Appl. No.: 18/360,604

(22) Filed: Jul. 27, 2023

(65) Prior Publication Data

US 2025/0036426 A1 Jan. 30, 2025

(51) Int. Cl.
*G06F 9/445* (2018.01)
*G06F 9/4401* (2018.01)
*G06F 9/451* (2018.01)

(52) U.S. Cl.
CPC ........ *G06F 9/44505* (2013.01); *G06F 9/4403* (2013.01); *G06F 9/451* (2018.02)

(58) Field of Classification Search
CPC ..... G06F 9/44505; G06F 9/451; G06F 9/4403
See application file for complete search history.

(56) References Cited

U.S. PATENT DOCUMENTS

| | | | | |
|---|---|---|---|---|
| 6,446,203 B1* | 9/2002 | Aguilar | ................. | G06F 9/4408 714/36 |
| 6,598,159 B1* | 7/2003 | McAlister | ............. | G06F 9/4416 709/222 |
| 8,583,906 B2* | 11/2013 | Harmer | ................... | G06F 9/451 713/1 |
| 11,397,593 B1* | 7/2022 | Lin | ..................... | G06F 9/44505 |
| 11,630,643 B2* | 4/2023 | Yamaguchi | ........... | G06F 9/4401 717/123 |
| 12,020,021 B2 | 6/2024 | Ansari | | |
| 12,061,912 B2* | 8/2024 | Poosapalli | ............ | G06F 9/4401 |

(Continued)

OTHER PUBLICATIONS

Non-Final Office Action, U.S. Appl. No. 18/360,669 mailed Apr. 1, 2025, U.S. Patent and Trademark Office.

(Continued)

*Primary Examiner* — Tammara R Peyton
(74) *Attorney, Agent, or Firm* — Jackson Walker L.L.P.

(57) ABSTRACT

An information handling system may include at least one processor and a computer-readable medium having instructions thereon that are executable by the at least one processor for: prior to initialization of an operating system, executing a first-party pre-boot firmware application, wherein the first-party pre-boot firmware application is configured to provide a graphics-mode interface; executing a third-party pre-boot firmware application, wherein the third-party pre-boot firmware application includes a visual forms representation (VFR); parsing, by the first-party pre-boot firmware application, the VFR; and displaying, by the graphics-mode user interface, a graphical user interface for the third-party pre-boot firmware application.

18 Claims, 2 Drawing Sheets

(56) References Cited

U.S. PATENT DOCUMENTS

| | | |
|---|---|---|
| 12,333,015 B2 * | 6/2025 | Medicherla ........... G06F 9/4401 |
| 2005/0125652 A1 | 6/2005 | Singer |
| 2007/0255936 A1 | 11/2007 | Stemen |
| 2008/0301424 A1 | 12/2008 | Barajas |
| 2011/0055535 A1 * | 3/2011 | Verdy ....................... G06F 8/61 |
| | | 713/100 |
| 2016/0188345 A1 * | 6/2016 | Chen ..................... G06F 9/4403 |
| | | 713/2 |
| 2020/0349009 A1 | 11/2020 | Samuel |
| 2023/0019196 A1 | 1/2023 | Sayyed |
| 2023/0418710 A1 | 12/2023 | Fukuda |
| 2024/0370271 A1 | 11/2024 | Sayyed |
| 2025/0021325 A1 | 1/2025 | Suryanarayana |

OTHER PUBLICATIONS

Notice of Allowance, U.S. Appl. No. 18/360,653 mailed Mar. 13, 2025, U.S. Patent and Trademark Office.

* cited by examiner

SYSTEM CONTEXT-CONTROLLED THIRD-PARTY FIRMWARE DISPLAY AND CONFIGURATION BY PARSING PRE-BOOT FIRMWARE APPLICATION BASED ON VIRTUAL FORMS REPRESENTATION (VFR)

TECHNICAL FIELD

The present disclosure relates in general to information handling systems, and more particularly to improving the capabilities of third party firmware applications in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems implement a pre-boot firmware environment such as a Unified Extensible Firmware Interface (UEFI) Basic Input/Output System (BIOS) environment. Historically, pre-boot environments have typically had simple, text-based interfaces. In some cases, a pre-boot environment may include capabilities for a graphics-mode rich presentation layer using a graphical interface and allowing mouse/touchpad interactions and accessibility features, and it may also include enhanced telemetry and other capabilities.

However, such features may generally be limited to first-party firmware applications (e.g., the code that is built into a BIOS image and signed by a manufacturer). Third-party applications (e.g., code that is provided by a third party and executed in a pre-boot environment) generally rely on text-mode, keyboard-only input, and other simple features that lack modern accessibility functionality. Additionally, pre-boot environments may impose limitations regarding when such third-party firmware applications can run. For example, some third-party applications cannot be run prior to the BDS boot phase, etc.

It would be advantageous to implement a framework wherein third-party firmware applications are able to inherit the features of the first-party BIOS platform, allowing for a consistent interface across all portions of the pre-boot environment.

For purposes of this disclosure, the term "first party" should be understood to include a manufacturer of an information handling system and/or a BIOS thereof. The term "third party" should be understood in context to include any party other than the first-party manufacturer of the information handling system and/or BIOS. Such a third party typically, although not necessarily, includes a manufacturer or provider of some component (e.g., a hardware, software, and/or firmware component) of the information handling system, and in such situations the third-party firmware application may be used for managing such component.

It is to be noted that various terms discussed herein are described in the UEFI Specification Version 2.10, released August 2022 (hereinafter, UEFI Specification), which is hereby incorporated by reference in its entirety. One of ordinary skill in the art with the benefit of this disclosure will understand its applicability to other specifications (e.g., prior or successor versions of the UEFI Specification). Further, some embodiments may be applicable to different technologies other than UEFI.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with third party firmware applications in information handling systems may be reduced or eliminated.

In accordance with embodiments of the present disclosure, an information handling system may include at least one processor and a computer-readable medium having instructions thereon that are executable by the at least one processor for: prior to initialization of an operating system, executing a first-party pre-boot firmware application, wherein the first-party pre-boot firmware application is configured to provide a graphics-mode interface; executing a third-party pre-boot firmware application, wherein the third-party pre-boot firmware application includes a visual forms representation (VFR); parsing, by the first-party pre-boot firmware application, the VFR; and displaying, by the graphics-mode user interface, a graphical user interface for the third-party pre-boot firmware application.

In accordance with these and other embodiments of the present disclosure, a method may include an information handling system executing, prior to initialization of an operating system, a first-party pre-boot firmware application, wherein the first-party pre-boot firmware application is configured to provide a graphics-mode interface; the information handling system executing a third-party pre-boot firmware application, wherein the third-party pre-boot firmware application includes a visual forms representation (VFR); the information handling system parsing, by the first-party pre-boot firmware application, the VFR; and the information handling system displaying, by the graphics-mode user interface, a graphical user interface for the third-party pre-boot firmware application.

In accordance with these and other embodiments of the present disclosure, an article of manufacture may include a non-transitory, computer-readable medium having computer-executable code thereon that is executable by a processor of an information handling system for: executing, prior to initialization of an operating system, a first-party pre-boot firmware application, wherein the first-party pre-boot firmware application is configured to provide a graphics-mode interface; executing a third-party pre-boot firmware application, wherein the third-party pre-boot firmware application includes a visual forms representation (VFR); parsing, by the first-party pre-boot firmware application, the VFR; and displaying, by the graphics-mode user interface, a graphical user interface for the third-party pre-boot firmware application.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
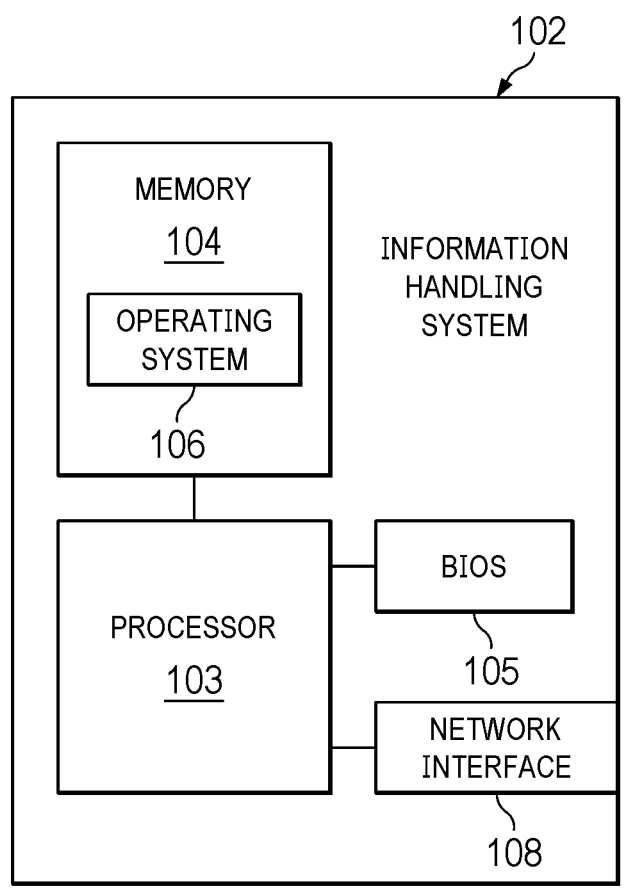
FIG. 1 illustrates a block diagram of an example information handling system, in accordance with embodiments of the present disclosure.
Figure 2:
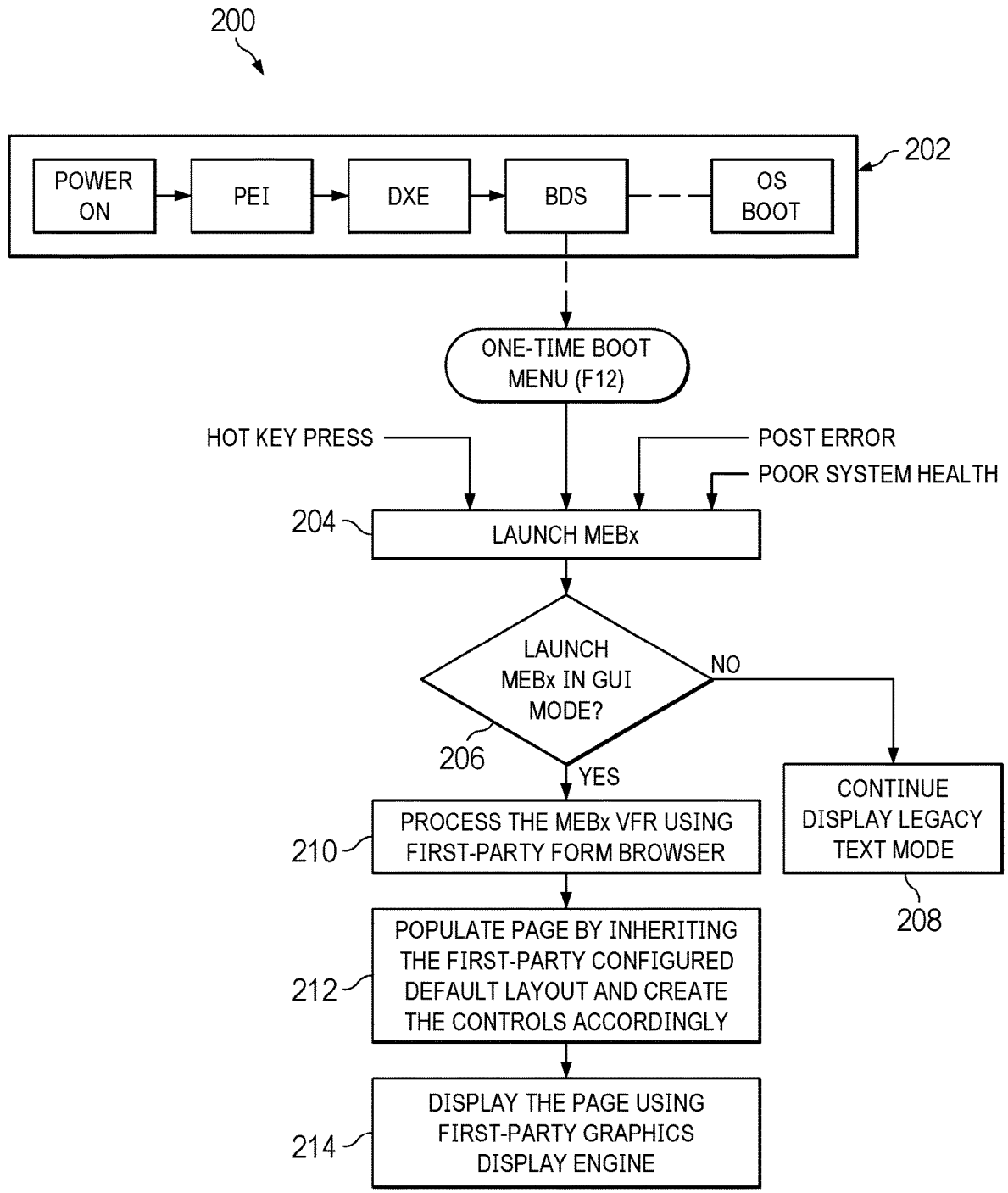
FIG. 2 illustrates a flow chart of a method, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such wires, optical fibers, as microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

As discussed above, embodiments of this disclosure may improve the functionality of third-party firmware applications. Embodiments may implement a unified method for allowing third-party firmware applications to use the same rich UI presentation layer as first-party applications.

In some embodiments, this may be achieved by introducing a new protocol that may be supported by both the first-party and the third-party components. For example, in one implementation, a data structure such as the following may be used:

```
OEM_CONTEXT_FW_CFG_PROTOCOL
{
UINT8 Platform SecurityState;
UINT8 Platform PowerState;
UINT8 Platform HealthState;
UINT8 BKC_Profile[ ];
UINT8 Telemetry[ ];
}
```

This protocol may allow for enhanced graphics and user interface functionality as described herein, as well as other features relating to security, power, system health, best-known configuration (BKC), and telemetry.

Turning now to FIG. 2, a flow chart of an example method 200 for allowing a third-party firmware application to use first-party features is shown, in accordance with some embodiments. As one of ordinary skill in the art with the benefit of this disclosure will appreciate, a third-party firmware application include may include a visual forms representation (VFR), which is a high-level description of the user interface. Method 200 leverages the VFR as described in more detail below.

For the sake of concreteness, FIG. 2 illustrates the use of an Intel® Management Engine BIOS Extension (MEBx) third-party application. MEBx provides platform-level configuration options for configuring the behavior of the Management Engine (ME) platform, such as enabling and disabling individual features, setting power configurations, etc. For example, MEBx may be used to access a remediation UI when an information handling system encounters a POST error or in other situations. One of ordinary skill in the art with the benefit of this disclosure will appreciate its applicability to other types of third-party applications as well.

At step 202, an information handling system is performing its normal boot phase operations (e.g., the SEC, PEI, DXE, BDS, etc. phases of a UEFI boot). At step 204, MEBx is launched (e.g., to change a configuration setting of the ME platform). As shown, this step may occur for any of a variety of reasons, such as a user pressing a hot key, a user selecting a boot menu, an occurrence of a POST error, a detection of poor system health, etc.

At step 206, the system determines (e.g., based on a configurable setting, a keypress, etc.) whether MEBx is to be launched in graphical user interface (GUI) mode. If not, then at step 208, MEBx executes in legacy text mode and the method ends.

If MEBx is configured for GUI mode, then at step 210 it may be invoked by a UEFI SendForm( ) call. The application VFR may then be parsed using the first-party form browser.

At step 212, a GUI screen may be created with a default layout specifically configured for displaying (e.g., on a monitor) third-party applications. The results of parsing the controls read from the VFR may be populated onto the page with provisions for user interactions, along with options to save the configurations, etc.

At step 214, the resulting page may be displayed using the graphics engine built in to the first-party firmware application via the OEM_CONTEXT_FW_CFG_PROTOCOL interface described above. In this way, enhanced graphics, mouse/touchpad interactions, accessibility features (e.g., color-blind mode, etc.), and other modern features may be inherited from the first-party framework.

One of ordinary skill in the art with the benefit of this disclosure will understand that the preferred initialization point for the method depicted in FIG. 2 and the order of the steps comprising the method may depend on the implementation chosen. In these and other embodiments, the method may be implemented as hardware, firmware, software, applications, functions, libraries, or other instructions.

Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a computer-readable medium having instructions thereon that are executable by the at least one processor for:
     prior to initialization of an operating system, executing a first-party pre-boot firmware application, wherein the first-party pre-boot firmware application is configured to provide a graphics-mode interface;
     executing a third-party pre-boot firmware application, wherein the third-party pre-boot firmware application includes a visual forms representation (VFR);
     parsing, by the first-party pre-boot firmware application, the VFR of the third-party pre-boot firmware application; and
     displaying, by the graphics-mode user interface, a graphical user interface for the third-party pre-boot firmware application based on the parsed VFR.

2. The information handling system of claim 1, wherein the graphical user interface is configured to accept user input via a mouse and/or touchpad.

3. The information handling system of claim 1, wherein the computer-readable medium includes a Basic Input/Output System (BIOS).

4. The information handling system of claim 3, wherein the BIOS comprises a Unified Extensible Firmware Interface (UEFI) BIOS.

5. The information handling system of claim 1, wherein the third-party pre-boot firmware application is configured to provide management of an information handling resource of the information handling system.

6. The information handling system of claim 1, wherein the graphical user interface comprises a default layout augmented with user interface elements based on the parsed VFR.

7. A method comprising:
   an information handling system executing, prior to initialization of an operating system, a first-party pre-boot firmware application, wherein the first-party pre-boot firmware application is configured to provide a graphics-mode interface;
   the information handling system executing a third-party pre-boot firmware application, wherein the third-party pre-boot firmware application includes a visual forms representation (VFR);
   the information handling system parsing, by the first-party pre-boot firmware application, the VFR of the third-party pre-boot firmware application; and
   the information handling system displaying, by the graphics-mode user interface, a graphical user interface for the third-party pre-boot firmware application based on the parsed VFR.

8. The method of claim 7, wherein the graphical user interface is configured to accept user input via a mouse and/or touchpad.

9. The method of claim 7, wherein the first-party pre-boot firmware application and the third-party pre-boot firmware application are stored on a Basic Input/Output System (BIOS).

10. The method of claim 9, wherein the BIOS comprises a Unified Extensible Firmware Interface (UEFI) BIOS.

11. The method of claim 7, wherein the third-party pre-boot firmware application is configured to provide management of an information handling resource of the information handling system.

12. The method of claim 7, wherein the graphical user interface comprises a default layout augmented with user interface elements based on the parsed VFR.

13. An article of manufacture comprising a non-transitory, computer-readable medium having computer-executable code thereon that is executable by a processor of an information handling system for:
   executing, prior to initialization of an operating system, a first-party pre-boot firmware application, wherein the first-party pre-boot firmware application is configured to provide a graphics-mode interface;
   executing a third-party pre-boot firmware application, wherein the third-party pre-boot firmware application includes a visual forms representation (VFR);
   parsing, by the first-party pre-boot firmware application, the VFR of the third-party pre-boot firmware application; and
   displaying, by the graphics-mode user interface, a graphical user interface for the third-party pre-boot firmware application based on the parsed VFR.

14. The article of claim 13, wherein the graphical user interface is configured to accept user input via a mouse and/or touchpad.

15. The article of claim 13, wherein the computer-readable medium includes a Basic Input/Output System (BIOS).

16. The article of claim 15, wherein the BIOS comprises a Unified Extensible Firmware Interface (UEFI) BIOS.

17. The article of claim 13, wherein the third-party pre-boot firmware application is configured to provide management of an information handling resource of the information handling system.

18. The article of claim 13, wherein the graphical user interface comprises a default layout augmented with user interface elements based on the parsed VFR.

* * * * *